US00RE38924E

(19) United States
(12) Reissued Patent
Ritchie et al.

(10) Patent Number: US RE38,924 E
(45) Date of Reissued Patent: Dec. 20, 2005

(54) SEX AID

(76) Inventors: Steven D. Ritchie, 504 John's Pass Ave., Madeira Beach, FL (US) 33708; Harlie David Reynard, 504 John's Pass Ave., Madeira Beach, FL (US) 33708

(21) Appl. No.: 10/272,335

(22) Filed: Oct. 16, 2002

Related U.S. Patent Documents

Reissue of:
(64) Patent No.: 6,132,366
Issued: Oct. 17, 2000
Appl. No.: 09/283,860
Filed: Apr. 1, 1999

(51) Int. Cl.[7] ..... A61H 21/00
(52) U.S. Cl. ..... 600/38
(58) Field of Search ..... 600/38–41

(56) References Cited

U.S. PATENT DOCUMENTS 870,087 A * 11/1907 Dickens ..... 241/101.3
1,944,926 A * 1/1934 Colbeth ..... 422/58
2,700,109 A * 1/1955 Argabrite ..... 250/377
3,726,141 A * 4/1973 Bremer ..... 374/202
3,968,690 A * 7/1976 Blouin et al. ..... 374/151
3,996,930 A * 12/1976 Sekulich
4,390,555 A * 6/1983 Levinson ..... 426/234
D272,649 S 2/1984 Bloch
5,114,495 A * 5/1992 Mainz ..... 134/11
5,387,179 A * 2/1995 Crivellaro
5,421,547 A * 6/1995 Phillips ..... 251/122
5,690,603 A * 11/1997 Kain
5,853,362 A * 12/1998 Jacobs

OTHER PUBLICATIONS

"TheOriginalGlassDildo.com" Two Printed Pages showing history of TOGD company. Apr. 30, 2003.*
Good Vibrations catalog; Summer 1997; p. 27.*

* cited by examiner

*Primary Examiner*—Samuel G. Gilbert
(74) *Attorney, Agent, or Firm*—Edward P. Dutkiewicz

(57) ABSTRACT

A sexual aid comprising a cylindrical rod is disclosed. The rod has a length with a first end and a second end. A sphere is integrally formed in the first end of the rod. A loop-shaped handle or a second sphere may be provided on the second end of the rod. The rod, sphere or spheres and/or handle are fabricated of a generally lubricous glass-based material containing an appreciable amount of an oxide of boron. A plurality of spheres may be provided on the rod intermediate the first and second ends.

11 Claims, 4 Drawing Sheets

SEX AID

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a new and improved sex aid and, more particularly, pertains to increasing stimulation during sex acts.

2. Description of the Prior Art

The use of sex aids of known designs and configurations is known in the prior art. More specifically, sex aids of known designs and configurations heretofore devised and utilized for the purpose of increasing sexual stimulation through known methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of sex aids of known designs and configurations. Byway of example, U.S. Pat. No. DES. 272,649 to Bloch discloses a the ornamental design for an exerciser for orifice muscles.

In this respect, the sex aid according to the present invention substantially departs from the conventional concepts and designs of the prior art, and in doing so provides an apparatus primarily developed for the purpose of increasing stimulation during sex acts.

Therefore, it can be appreciated that there exists a continuing need for a new and improved sex aid which can be used for increasing stimulation during sex acts. In this regard, the present invention substantially fulfills this need.

SUMMARY OF THE INVENTION

In view of the foregoing disadvantages inherent in the known types of sex aids of known designs and configurations now present in the prior art, the present invention provides a new and improved sex aid. As such, the general purpose of the present invention, which will be described subsequently in greater detail, is to provide a new and improved sex aid and methods which have all the advantages of the prior art and none of the disadvantages.

To attain this, the present invention essentially comprises a new and improved sexual aid system for increasing stimulation during sex acts. The system comprises a cylindrical rod having a length of between about 2½ and 3% inches, preferably 3 inches. The rod has a first end and a second end and an intermediate cylindrical portion therebetween, the intermediate portion having a diameter of between about ⅜ and ⅝ inches, preferably ½ inches. A first sphere is integrally formed in the first end of the rod, the sphere having a diameter of between about ¾ inches and 1¼ inches, preferably 1 inches. A second sphere is integrally formed in the second end of the rod, the second sphere having a diameter of between about ¾ inches and 1¼ inches, preferably 1 inches. The rod and first sphere and second spheres are fabricated of a generally lubricous glass-based material containing an appreciable amount of an oxide of boron to reader it lubricious and resistant to heat, chemicals and electricity.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sex aid which has all the advantages of the prior art sex aids of known designs and configurations and none of the disadvantages.

It is another object of the present invention to provide a new and improved sex aid which may be easily and efficiently manufactured and marketed.

It is a further object of the present invention to provide a new and improved sex aid which is of a durable and reliable construction.

It is yet a further object of the present invention to provide a new and improved sex aid which may be readily sterilized for improved sanitation.

An even further object of the present invention is to provide a new and improved sex aid which is susceptible of a low cost of manufacture with regard to both materials and labor, and which accordingly is then susceptible of low prices of sale to the consuming public, thereby making such a sex aid economically available to the buying public.

Even still another object of the present invention is to increase stimulation during sex acts.

Lastly, it is an object of the present invention to provide a sexual aid comprising a cylindrical rod. The rod has a length with a first end and a second end. A sphere is integrally formed in the first end of the rod. A loop-shaped handle or a second sphere may be provided on the second end of the rod. The rod, sphere or spheres and/or handle are fabricated of a generally lubricous glass-based material containing an appreciable amount of an oxide of boron. A plurality of spheres may be provided on the rod intermediate the first and second ends.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
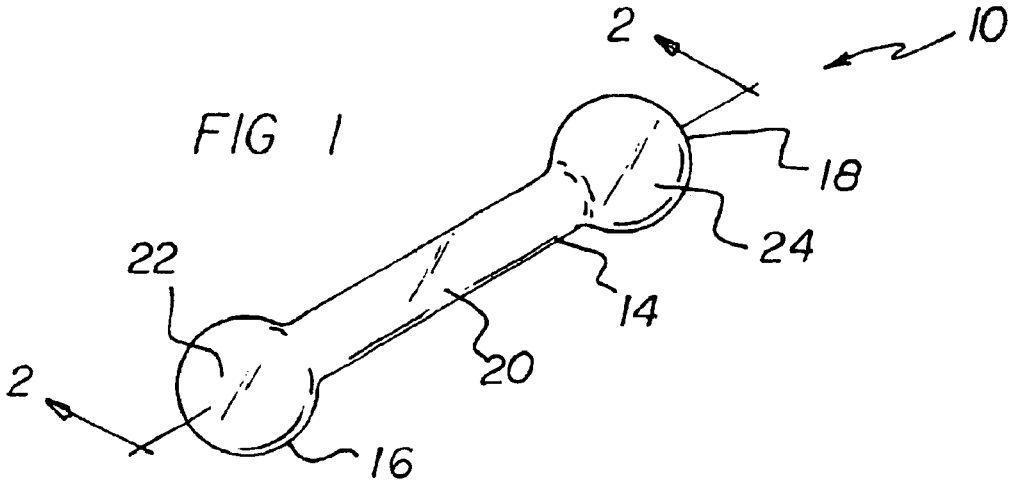
FIG. 1 is a perspective illustration of the preferred embodiment of the sex aid constructed in accordance with the: principles of the present invention.
Figure 2:
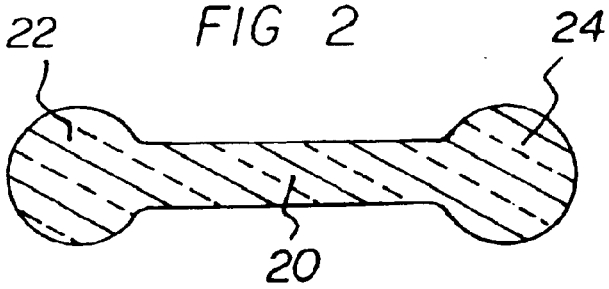
FIG. 2 is a cross-sectional view taken along line 2—2 of FIG. 1.
Figure 3:
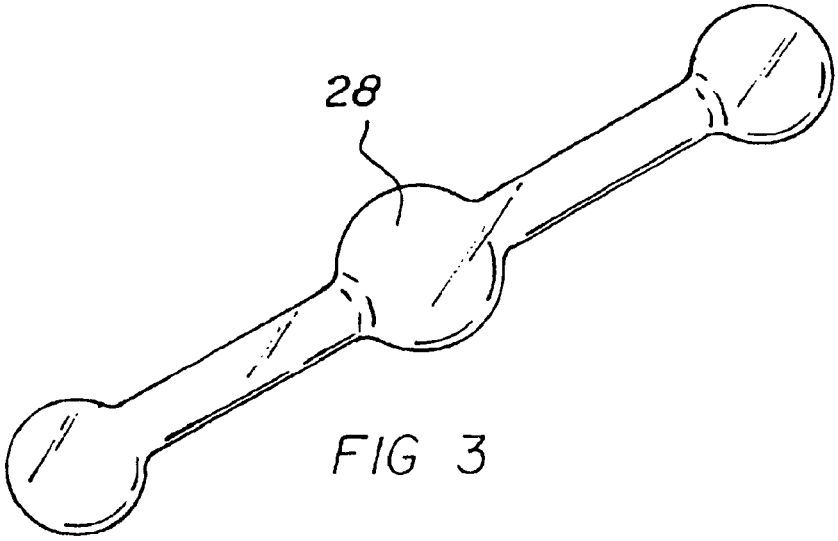
FIG. 3 is a perspective illustration of an alternate embodiment of the invention.
Figure 4:
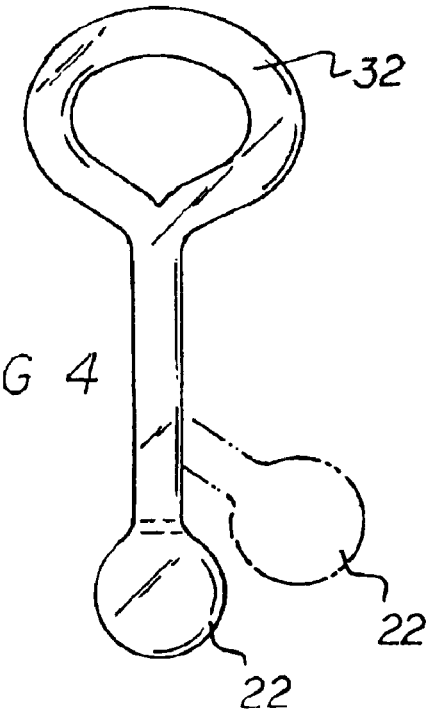
FIGS. 4 and 5 are a front and side elevational view of a further alternate embodiment of the invention.
Figure 5:
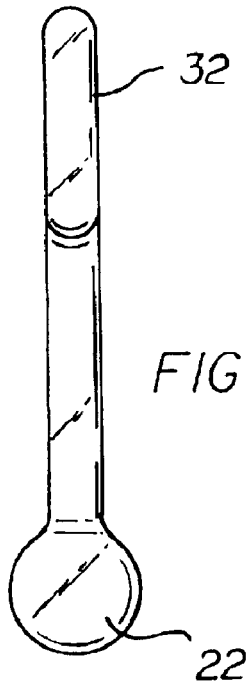
Figure 6:
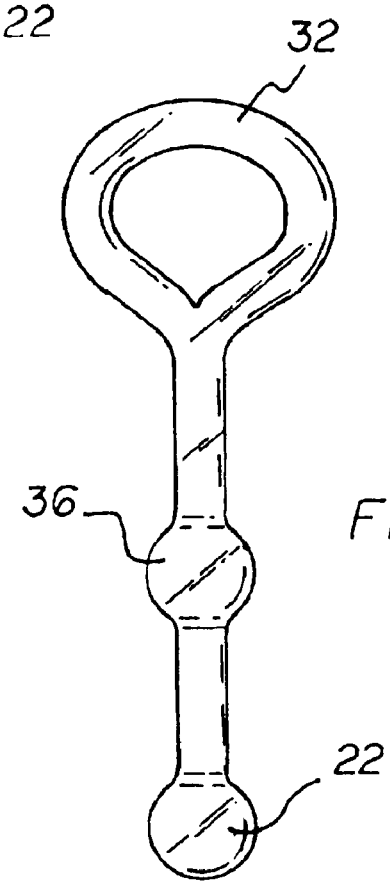
FIGS. 6, 7, 8 and 9 are further alternate embodiments of the invention.
Figure 7:
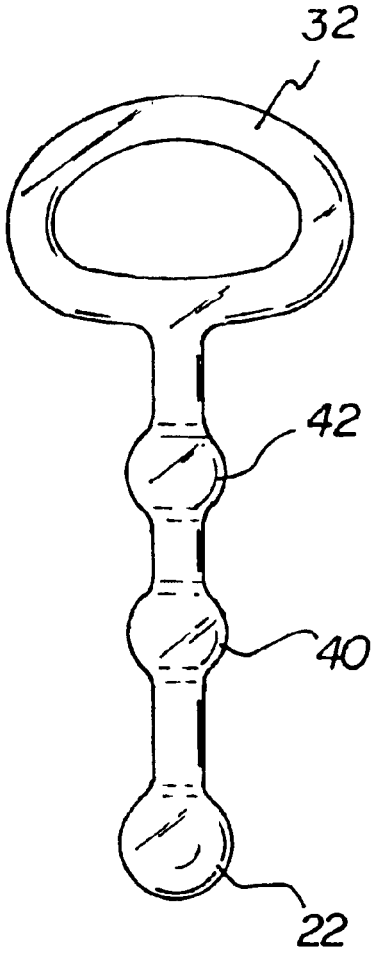
Figure 8:
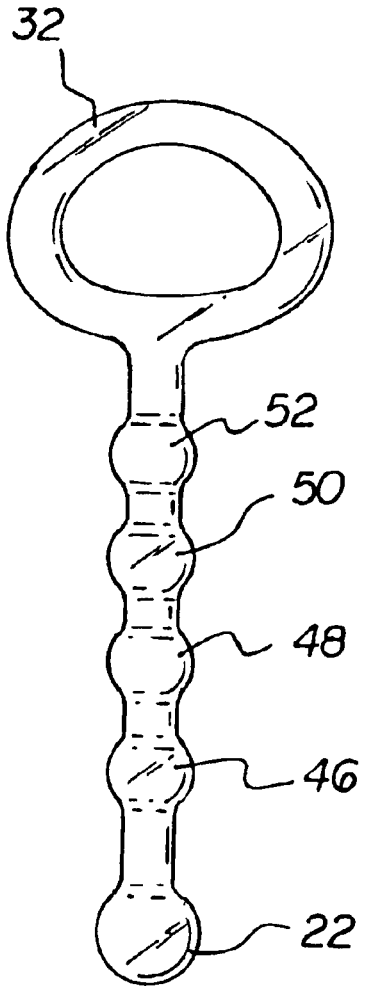
Figure 9:
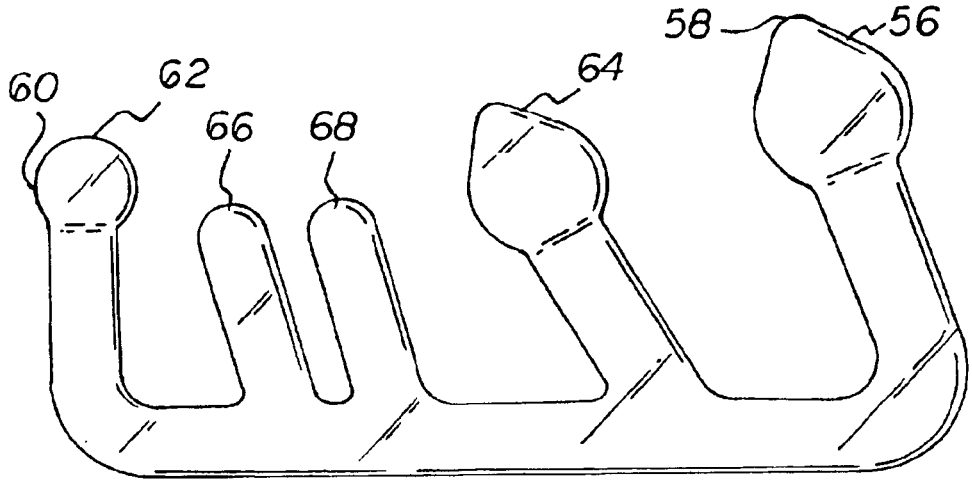

With reference now to the drawings, and in particular to FIG. 1 thereof, the preferred embodiment of the new and improved sex aid embodying the principles and concepts of the present invention and generally designated by the reference numeral 10 will be described.

The present invention, the new and improved sex aid, is a system 10 comprised of a plurality of components. Such components, in their broadest context, include a cylindrical rod, a first end, and a second end. Each of the individual components is specifically configured and correlated one with respect to the other so as to attain the desired objectives.

The first component of the new and improved sexual aid system 10 for increasing stimulation during sex acts is a cylindrical rod 14. The rod has a length of between about 2½ and 3½ inches, preferably 3 inches. The rod also has a first end 16 and a second end 18 and an intermediate cylindrical portion 20 therebetween. The intermediate portion of the rod has a diameter of between about ⅜ and ⅝ inches, preferably ½ inches.

The second component of the system is a first sphere 22. The first sphere is integrally formed in the first end of the rod. The sphere has a diameter of between about ¾ inches and 1¼ inches, preferably 1 inches.

The last component of the sexual aid system is a second sphere 24 integrally formed in the second end of the rod. The second sphere has a diameter of between about 1¾ inches and 1¼ inches, preferably 1 inches.

All components of the sexual aid system, the rod and first sphere and second sphere, are fabricated of a generally lubricous glass-based material. This glass-based material contains an appreciable amount of an oxide of boron to render it lubricious and resistant to heat, chemicals, electricity and bacterial absorption.

An alternate embodiment of the sex aid further includes a second sphere on the second end of the rod for use as a handle with a third sphere 28 on the rod intermediate the first and second spheres.

A further alternate embodiment of the sex aid includes a loop-shaped handle 32 on the second cad of the rod instead of a sphere. Handle 32 is formed at the end of the central rod wherein the central rod is bent midway along its length to form an acute angle.

Yet another alternate embodiment of the sex aid includes a loop-shaped handle 32 on the second end of the rod and a supplemental sphere 36 at an intermediate point of the rod.

Another embodiment of the sex aid includes a loop-shaped handle 32 on the second cud of the rod and a plurality of spheres 40,42 and 46,48,50,52 formed in a central extent of the rod.

A final embodiment of the sex aid includes the first end 56 which is turned to an obtuse angle with respect to the rod and includes a cone-shaped tip 58 for anal insertion. The second end 60 is turned to a right angle with respect to the rod with a sphere 62 at its end for constituting a handle. Next provided is a cone-shaped vaginal inserter 64 adjacent to the first end with two parallel short rods 66, 68 adjacent to the second end for clitoral stimulation.

The present invention is a group of stimulation devices designed for anal and/or vaginal stimulation. Each of the six embodiments has a unique grouping of knobs, or spheres, and/or handles for stimuation and handling of the devices.

Each of the embodiments of the present invention are hand-crafted from solid glass-based rods. As such, the devices will stay slick for a long time without reapplying extra lubrication or rewetting. In addition, the devices will not hold odor. Each device is seamless, and created individually, one at a time. The devices are inspected carefully to insure perfect smoothness. The devices may be sterilized, washed in soap and water, wiped with alcohol or autoclaved. The devices may be used with water and oil-based lubricants. Unlike conventional water-based lubricants used to protect latex condoms which become sticky when used on rubber-like devices, the present invention provides smooth contact with rectal tissues. This arrangement of components and materials renders the present invention very suitable for mass production.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sexual aid comprising:

a *solid* cylindrical rod *made of a single material* having a length with a first end and a second end;

a sphere integrally formed in the [first] *second* end of the rod, the rod and sphere being fabricated of a lubricous glass-based material; and wherein the first end is turned to an obtuse angle with respect to the rod and includes a cone-shaped tip for anal insertion and the second end is turned to a right angle with respect to the rod with a sphere at the second end for constituting a handle and further including a cone-shaped vaginal inserter adjacent to the first end with two parallel short rods adjacent to the second end for clitoral stimulation.

*2. A sexual aid comprising:*

*a solid rod having a length with a first end and a second end constituting a gripping area; and*

*a spherical enlargement integrally formed in the first end of the rod, the rod and enlargement being fabricated of a generally lubricious glass-based material containing an appreciable amount of an oxide of boron to render it lubricious and resistant to heat, chemicals, electricity and bacterial absorption, with the rod having a bend within its length between the gripping area and the first end having the spherical enlargement.*

*3. The aid as set forth in claim 2 wherein there are plural enlargements.*

*4. The aid as set forth in claim 2 wherein the gripping area is a loop.*

*5. The aid as set forth in claim 2 wherein there are plural enlargements and the gripping area is a loop.*

*6. A sexual aid kit comprising the sexual aid as set forth in claim 2 and further including a water based lubricant used with the aid.*

*7. A sexual aid kit comprising the sexual aid as set forth in claim 2 and further including an oil based lubricant used with the aid.*

*8. A method of using a sex aid to increase stimulation during sex acts comprising the steps of:*

*providing a rod having a length with a first end and a second end constituting a gripping area;*

*providing an enlargement integrally formed in the first end of the rod, the rod and enlargement being fabricated of a generally lubricious glass-based material containing an appreciable amount of an oxide of boron to render it lubricious and resistant to heat, chemicals, electricity and bacterial absorption, and*

*stimulating a user through the provided sex aid during anal and vaginal stimulation.*

*9. The method as set forth in claim 8 and further including the step of utilizing the sex aid with a water based lubricant.*

*10. The method as set forth in claim 8 and further including the step of utilizing the sex aid with an oil based lubricant.*

*11. The aid as set forth in claim 2 wherein the bend is an obtuse angle.*

* * * * *